(12) United States Patent
Tokuhiro et al.

(10) Patent No.: US 8,999,119 B2
(45) Date of Patent: Apr. 7, 2015

(54) HYDROGEN PRODUCTION DEVICE

(75) Inventors: Kenichi Tokuhiro, Osaka (JP); Takaiki Nomura, Osaka (JP); Kazuhito Hato, Osaka (JP); Noboru Taniguchi, Osaka (JP); Takahiro Suzuki, Osaka (JP); Satoru Tamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/702,443

(22) PCT Filed: Aug. 26, 2011

(86) PCT No.: PCT/JP2011/004774
§ 371 (c)(1),
(2), (4) Date: Dec. 6, 2012

(87) PCT Pub. No.: WO2012/032733
PCT Pub. Date: Mar. 15, 2012

(65) Prior Publication Data
US 2013/0075250 A1 Mar. 28, 2013

(30) Foreign Application Priority Data
Sep. 7, 2010 (JP) ................ 2010-199692

(51) Int. Cl.
C25B 1/04 (2006.01)
C25B 1/02 (2006.01)
(Continued)

(52) U.S. Cl.
CPC ............ *C25B 11/0442* (2013.01); *B01J 35/004* (2013.01); *C01B 3/042* (2013.01);
(Continued)

(58) Field of Classification Search
CPC ............. C25B 1/04; C25B 9/00; C25B 9/06; C25B 11/02; C25B 11/0405; C25B 15/00; C25B 1/02; C25B 9/10; C25B 9/08; C25B 9/02; C25B 13/00; C25B 9/206
USPC .............. 204/252, 242, 280, 288.1, 282, 295
See application file for complete search history.

(56) References Cited

U.S. PATENT DOCUMENTS 4,596,648 A * 6/1986 Sweeney .................... 204/237
7,271,334 B2 9/2007 Gratzel et al.
(Continued)

FOREIGN PATENT DOCUMENTS

JP 57-191202 11/1982
JP 2001-286749 10/2001
(Continued)

OTHER PUBLICATIONS
English Translation of JP2001-286749 to Miyata (2001).*
(Continued)

*Primary Examiner* — Zulmariam Mendez
(74) *Attorney, Agent, or Firm* — Hamre, Schumann, Mueller & Larson, P.C.

(57) ABSTRACT

The hydrogen production device of the present invention includes: a first electrode including a conductive substrate and a photocatalytic semiconductor layer; a second electrode that is electrically connected to the first electrode and disposed in a second region opposite to a first region relative to the first electrode; the first region is defined as a region on a side of a surface of the first electrode in which the photocatalytic semiconductor layer is provided; a water-containing electrolyte solution; and a housing containing these. The first electrode is provided with first through-holes and the second electrode is provided with second through-holes; and the first through-holes and second through-holes form a communicating hole for allowing the first region and the second region to communicate with each other. An ion exchange membrane having substantially the same shape as the communicating hole is disposed in the communicating hole to close the communicating hole.

13 Claims, 9 Drawing Sheets

(51) Int. Cl.
*C25B 9/00* (2006.01)
*C25B 9/06* (2006.01)
*C25B 9/08* (2006.01)
*C25B 9/10* (2006.01)
*C25B 13/00* (2006.01)
*C25B 11/02* (2006.01)
*C25B 15/00* (2006.01)
*C25B 11/04* (2006.01)
*C01B 3/04* (2006.01)
*C25B 1/00* (2006.01)
*C25B 11/03* (2006.01)
*B01J 35/00* (2006.01)

(52) U.S. Cl.
CPC ............... *C25B 1/003* (2013.01); *C25B 11/03* (2013.01); *C25B 9/08* (2013.01); *Y02E 60/364* (2013.01); *Y02E 60/368* (2013.01)

(56) References Cited

U.S. PATENT DOCUMENTS

2006/0140827 A1    6/2006  Cheng et al.
2013/0032491 A1*   2/2013  Nitta et al. .................... 205/758

FOREIGN PATENT DOCUMENTS

| JP | 2004-504934 | | 2/2004 | |
| JP | 2006-089336 | | 4/2006 | |
| JP | 2006-302695 | * | 11/2006 | |
| WO | WO2005113859 | * | 12/2005 | ............... C25B 1/00 |

OTHER PUBLICATIONS

English Translation of JP2006-302695 to Oi (2006).*

* cited by examiner

HYDROGEN PRODUCTION DEVICE

TECHNICAL FIELD

The present invention relates to a hydrogen production device for producing hydrogen through decomposition of water in a cell by irradiating an electrode including at least a photocatalytic semiconductor with light.

BACKGROUND ART

Hydrogen energy systems have attracted attention from the viewpoints of reducing carbon dioxide emissions and promoting clean energy. When hydrogen is used as an energy carrier, electricity and heat can be produced from hydrogen in a fuel cell, while heat and power can be produced by direct combustion of hydrogen. In these cases, safe and innocuous water is obtained as a final product, a clean energy cycle can be created. In most cases, hydrogen as an energy carrier is produced from petroleum or natural gas by catalytic cracking, although it occurs naturally as well. It also is possible to produce hydrogen and oxygen by water electrolysis, but this cannot be a fundamental solution because the electrolysis requires electrical energy. It also is possible to use a system in which a solar cell converts light energy into electricity so as to perform electrolysis with this electric power. However, in terms of the production cost, energy consumption, and electricity storing capacity of the solar cell, the hydrogen production method using such a system is not necessarily an effective one.

In contrast, hydrogen production using a photocatalyst is a system for producing hydrogen directly from water and sunlight, and can convert the solar energy effectively into hydrogen energy.

Several proposals have been made about the configuration of a hydrogen production device using a photocatalyst. For example, Patent Literature 1 proposes a hydrogen production device including a photocatalyst layer disposed on the bottom of a reaction vessel and a water layer flowing on the photocatalyst layer. In this device, water in the water layer is decomposed by irradiating the photocatalyst layer with light so as to obtain oxygen gas and hydrogen gas. Patent Literature 2 proposes a hydrogen production device in which an oxygen producing electrode side region and a hydrogen producing electrode side region in a cell are separated from each other by a conductive substrate and an ion exchange membrane. Patent Literature 3 proposes a hydrogen production device having a structure in which a positive electrode, including a substrate with small through-holes, and a platinum thin film and a photosemiconductor thin film formed thereon, and a negative electrode having a platinum layer are bonded to each other with an ion exchange membrane interposed therebetween. In this hydrogen production device, the positive electrode and the negative electrode are electrically connected through an external circuit.

CITATION LIST

Patent Literature

Patent Literature 1 JP 57 (1982)-191202 A
Patent Literature 2 JP 2006-089336 A
Patent Literature 3 JP 2001-286749 A

SUMMARY OF INVENTION

Technical Problem

However, in the hydrogen production device disclosed in Patent Literature 1, water is decomposed on the same photocatalyst layer, and thus hydrogen and oxygen are produced in the form of a mixture thereof. Therefore, it is difficult to separate hydrogen and oxygen.

In the hydrogen production device disclosed in Patent Literature 2, the hydrogen producing electrode side region and the oxygen producing electrode side region are separated by the conductive substrate and the ion exchange membrane. Therefore, the produced hydrogen and oxygen can be collected separately from each other. However, these regions are separated mainly by the conductive substrate, and the ion exchange membrane is disposed only in the periphery of the electrode. Therefore, this configuration does not allow ions in a solution to diffuse throughout the electrode, which causes a problem that water decomposition reaction actually occurs only in the vicinity of the ion exchange membrane on the electrode.

In the hydrogen production device disclosed in Patent Literature 3, the positive electrode and the negative electrode, each having small through-holes for forming a liquid junction, are connected through the external circuit, and the ion exchange membrane is disposed between the positive electrode and the negative electrode. This configuration allows the produced hydrogen and oxygen to be collected separately from each other. This configuration not only allows hydrogen and oxygen to be produced separately from each other but also allows ions to be exchanged smoothly between the positive electrode and the negative electrode through the small through-holes provided in the positive electrode and the negative electrode. However, this hydrogen production device has a structure in which the ion exchange membrane is disposed entirely between the positive electrode and the negative electrode, that is, the whole of the positive electrode and the whole of the negative electrode sandwich the ion exchange membrane having an area larger than the area of the electrode. Therefore, this hydrogen production device requires a large area ion exchange membrane, which causes a problem that it is very difficult to reduce cost. In addition, this configuration has many structural constraints. For example, an external circuit must be provided for conduction between the positive electrode and the negative electrode. Therefore, it may be difficult to achieve reduction in space and cost.

The present invention has been made to solve the above conventional problems, and it is an object of the present invention to provide a hydrogen production device capable of achieving cost reduction and further space reduction without decreasing its hydrogen production efficiency.

Solution to Problem

The present invention provides a hydrogen production device including: a first electrode including a conductive substrate and a photocatalytic semiconductor supported on the conductive substrate; a second electrode that is electrically connected to the first electrode and disposed in a second region opposite to a first region relative to the first electrode, when the first region is defined as a region on a side of a surface of the first electrode in which the photocatalytic semiconductor is provided; a water-containing electrolyte solution in contact with the photocatalytic semiconductor and the second electrode; and a housing containing the first electrode, the second electrode, and the electrolyte solution. In this hydrogen production device, the first electrode is provided with a through-hole at a position and the second electrode is provided with a through-hole at a position corresponding to the position and the through-holes form a communicating hole for allowing the first region and the second region to communicate with each other, and an ion exchange membrane having substantially the same shape as the communicating hole is disposed in the communicating hole to close the communicating hole.

Advantageous Effects of Invention

The hydrogen production device of the present invention has a communicating hole that allow the first region in which the photocatalytic semiconductor is in contact with the electrolyte solution and the second region in which the second electrode is in contact with the electrolyte solution to communicate with each other. Thereby, the electrolyte solution and ions are exchanged smoothly between the first region and the second region. As a result, a sufficient amount of ions are supplied to the surface of the photocatalytic semiconductor of the first electrode and the surface of the second electrode, respectively, and thus a decrease in the hydrogen production efficiency can be suppressed. The ion exchange membrane has substantially the same shape as the communicating hole, and is disposed in the communicating hole to close it. Therefore, the hydrogen production device of the present invention makes it possible not only to collect produced gases separately but also to reduce cost more than a configuration in which an ion exchange membrane is disposed entirely between the electrodes. Furthermore, since the ion exchange membrane may be disposed in any manner as long as it is disposed to close the communicating hole, the structural constraints are relaxed to increase the flexibility of design and thus to achieve further reduction in cost and space.

DESCRIPTION OF EMBODIMENTS

Hereafter, an embodiment of the present invention is described with reference to FIG. 1A and FIG. 1B. The following embodiment is merely an example, and the present invention is not limited to this embodiment.

Figure 1A:
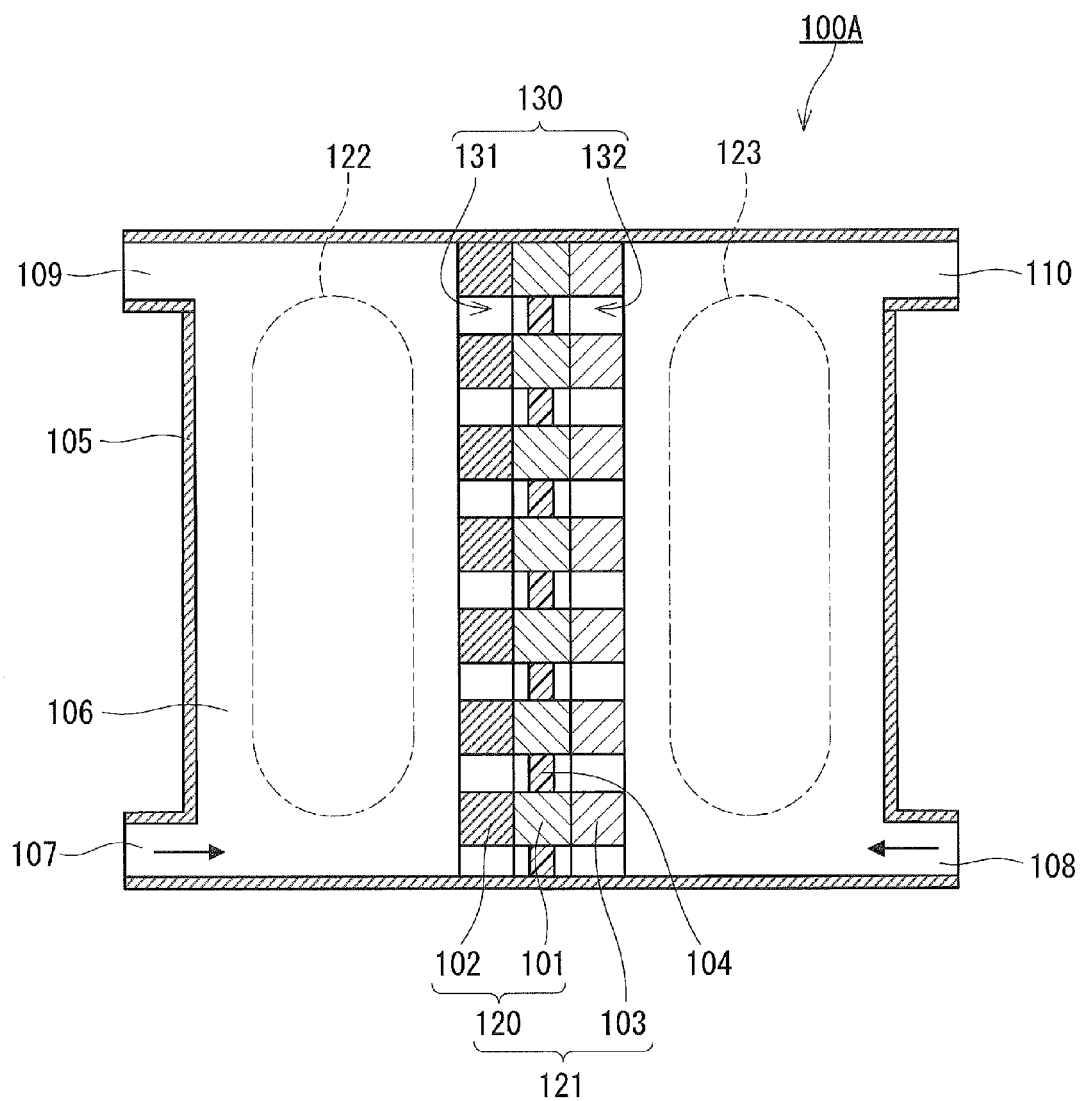
FIG. 1A is a diagram showing a configuration example of a hydrogen production device according to a first embodiment of the present invention.
Figure 1B:
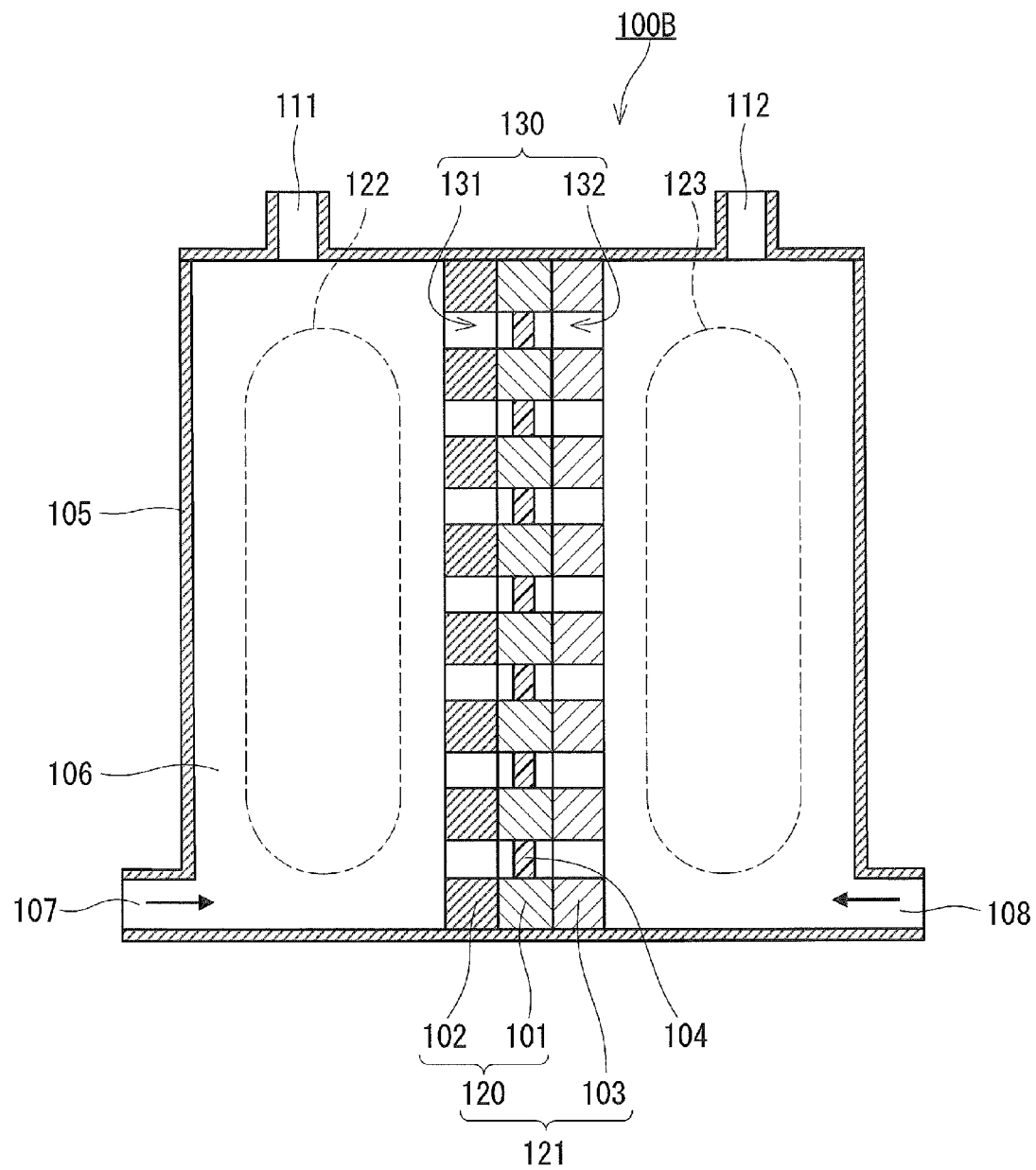
FIG. 1B is a diagram showing another configuration example of the hydrogen production device according to the first embodiment of the present invention.

FIG. 1A shows a configuration example of a hydrogen production device according to the present embodiment.

A hydrogen production device 100A shown in FIG. 1A includes an electrode unit 121 for producing hydrogen and oxygen through decomposition of water by light irradiation, a water-containing electrolyte solution 106, and a housing 105 containing the electrode unit 121 and the electrolyte solution 106.

The electrode unit 121 includes a first electrode (photo-semiconductor electrode) 120 and a second electrode (counter electrode) 103. The first electrode 120 is formed of a conductive substrate 101 and a photocatalytic semiconductor layer 102. The photocatalytic semiconductor layer 102 is disposed on one surface of the conductive substrate 101 and exhibits photocatalytic activity.

The second electrode 103 is disposed, relative to the first electrode 120, in a region (second region) 123 opposite to a region (first region) 122 on the side of a surface of the first electrode 120 in which the photocatalytic semiconductor layer 102 is provided. The second electrode 103 is electrically connected to the first electrode 120. In the present embodiment, the second electrode 103 is disposed in contact with the other surface of the conductive substrate 101 on which the photocatalytic semiconductor layer 102 is not supported. That is, the second electrode 103 is electrically connected to the first electrode 120 by direct contact with the first electrode 120.

For the conductive substrate 101, for example, a metal substrate made of a metal such as titanium, tantalum or gold, or a glassy carbon substrate can be used.

The photocatalytic semiconductor layer 102 does not necessarily have to be made of a single phase material. The photocatalytic semiconductor layer 102 may be made of a plurality of semiconductor materials, or may contain a promoter such as platinum. As used herein, a photocatalytic semiconductor refers to a semiconductor material that generates excited electrons and positive holes when irradiated with light such as ultraviolet light or visible light and allows the electrons and holes to cause various reactions. In the present embodiment, a photocatalytic semiconductor in the form of a layer is disposed on the conductive substrate 101, but the photocatalytic semiconductor is not limited to this structure. The photocatalytic semiconductor may be in any form as long as it is supported on the conductive substrate 101. Therefore, the photocatalytic semiconductors having other structures, such as an island structure formed on the conductive substrate 101, also can be used.

When the conductive substrate 101 and the second electrode 103 are disposed adjacent to and in contact with each other, they must be disposed not to interfere with electrical conduction between the conductive substrate 101 and the second electrode 103.

The second electrode 103 may be formed in any manner as long as it is formed such that the electrical conduction with the conductive substrate 101 can be established. Therefore, the conductive substrate 101 and the second electrode 103, which are fabricated separately, may be laminated together. The second electrode 103 may be formed on the surface of the conductive substrate 101 on which the photocatalytic semiconductor layer 102 is not provided, by a thin film forming means such as vapor deposition or sputtering. The conductive substrate 101 and the photocatalytic semiconductor layer 102 may be formed in this order on the second electrode 103 by a thin film forming means.

The first electrode 120 is provided with through-holes 131 at positions and the second electrode 103 is provided with through-holes 132 at positions corresponding to the positions. The corresponding position means the position at which a hole passing through the electrode unit 121 can be formed when the first electrode 120 and the second electrode 103 are laminated together, that is, the first electrode 120 and the second electrode 103 are joined into one electrode unit 121. Through-holes formed by the through-holes 131 of the first electrode 120 and the through-holes 132 of the second electrode 103 serve as communicating holes 130 for allowing the first region 122 and the second region 123 to communicate with each other.

Ion exchange membranes 104 having substantially the same shape as the communicating holes 130 are disposed in the communicating holes 130 to close them. In the present embodiment, the ion exchange membranes 104 are disposed not to interrupt the conduction between the conductive substrate 101 and the second electrode 103. For example, the ion exchange membranes 104 may be formed by filling the formed communicating holes 130 with a material serving as an ion exchanger. Alternatively, configurations of electrodes of Examples 1 to 4 to be described later may be employed. Specifically, first, a groove having a depth almost equal to the thickness of the ion exchange membrane is formed around the edge of each of the through-holes on the surface of the conductive substrate 101 in contact with the second electrode 103. The ion exchange membranes are fitted into the grooves, and then the second electrode 103 is formed on the conductive substrate 101. The ion exchange membranes 104 may be disposed in the communicating holes 130 in this manner. After the first electrode 120 and the second electrode 103 are laminated together, the ion exchange membranes 104 may be attached to close the communicating holes 130 from the first electrode 120 side or the second electrode 103 side. The ion exchange membranes 104 may be fitted into the communicating holes 130.

Materials that can be used for the ion exchange membrane 104 include, but are not limited to, perfluorocarbon, methacrylate or acrylate materials each containing an ion exchange group such as a sulfonic acid group, a carboxylic acid group, a hydroxyl group, or an amino group.

The material to be disposed in the communicating holes 130 is not necessarily limited to an ion exchange membrane. Any material can be used as long as it prevents the mixture of oxygen and hydrogen produced on the first electrode 120 and the second electrode 103 and allows the exchange of ions between the first region 122 and the second region 123.

As used herein, the phrase "the ion exchange membrane 104 has substantially the same shape as the communicating hole 130" means that the shape of the ion exchange membrane 104 is the same as that of the communicating hole 130, or that the shape of the ion exchange membrane 104 includes, in addition to the shape of the communicating hole 130, a portion needed to place the ion exchange membrane 104 in the communicating hole 130 (for example, a portion needed to fix the ion exchange membrane 104 to the inside of the communicating hole 130, such as an area or a margin like an overlap width).

At least a part of the electrode unit 121 is contained in the housing 105 made of a material, such as quartz, that transmits visible and ultraviolet radiation of sunlight.

The housing 105 has a structure including a first electrode 120 side region, i.e., a first region 122, and a second electrode 103 side region, i.e., a second region 123, which are partitioned by the electrode unit 121. The housing 105 is provided with electrolyte solution inlets 107 and 108 and electrolyte solution outlets 109 and 110 and is configured to circulate an electrolyte solution 106 therethrough. In this configuration, gases (hydrogen and oxygen) produced in the hydrogen production device 100A are introduced outside the housing 105 together with the electrolyte solution 106, and then separated from the electrolyte solution 106.

The electrolyte solution 106 contains water used for decomposition by the photocatalytic semiconductor layer 102. The water-containing electrolyte solution 106 may consist of water, or may further contain an electrolyte, a redox substance, and/or a sacrificial reagent, etc., when necessary.

In the hydrogen production device 100A of the present embodiment, ions are exchanged smoothly between the first region 122 and the second region 123 through the communicating holes 130. Therefore, a sufficient amount of ions are supplied to the surface of the photocatalytic semiconductor layer 102 of the first electrode 120 and the surface of the second electrode 103, respectively. As a result, high hydrogen production efficiency is achieved. The ion exchange membranes 104 have substantially the same shape as the communicating holes 130, and are disposed to close the communicating holes 130. Therefore, a significant cost reduction can be achieved, compared to a conventional configuration in which an ion exchange membrane is disposed entirely between electrodes. Furthermore, in the hydrogen production device 100A in which the ion exchange membranes 104 are not disposed entirely between the electrodes, the first electrode 120 and the second electrode 103 can be contacted directly with each other. This eliminates the need to provide an external circuit for electrically connecting the first electrode 120 and the second electrode 103, and thereby achieves not only further cost reduction but also space reduction. In addition, the direct contact between the first electrode 120 and the second electrode 103 brings about an effect of eliminating the ohmic loss due to a conducting wire and thus increasing the quantum efficiency, compared to the case where the electrodes are connected by an external circuit.

Next, the operating principle of the hydrogen production device 100A of the present embodiment is described.

When the photocatalytic semiconductor layer 102 is irradiated with sunlight through a portion of the housing 105 that transmits at least visible radiation of sunlight, excited electrons and positive holes are generated in the photocatalytic semiconductor layer 102.

For example, in the case where the photocatalytic semiconductor layer 102 is made of an n-type semiconductor material, the generated positive holes decompose water and produce oxygen on the surface of the photocatalytic semiconductor layer 102 by a chemical reaction represented by the following reaction formula (1). On the other hand, the generated excited electrons are transferred from the photocatalytic semiconductor layer 102 to the conductive substrate 101 and further transferred from the conductive substrate 101 to the second electrode 103. The electrons decompose water and produce hydrogen on the second electrode 103 by a chemical reaction represented by the following reaction formula (2).

$$4h^+ + 2H_2O \rightarrow O_2\uparrow + 4H^+ \quad (1)$$

$$4e^- + 4H^+ \rightarrow 2H_2\uparrow \quad (2)$$

In this case, exchange of ions in the electrolyte solution 106 between the first region 122 and the second region 123 partitioned by the electrode unit 121 in the housing 105 is performed through the ion exchange membranes 104 disposed in the communicating holes 130 provided in the electrode unit 121.

The produced hydrogen and oxygen are introduced outside the housing 105 without being mixed in the housing 105. The hydrogen production device 100A is provided with an electrolyte solution inlet 107 and an electrolyte solution outlet 109 on the side of the first electrode 120 as a working electrode, and with an electrolyte solution inlet 108 and an electrolyte solution outlet 110 on the side of the second electrode 103 as a counter electrode. The hydrogen production device 100A is configured to circulate the electrolyte solution 106 to introduce hydrogen and oxygen outside the housing 105 together with the electrolyte solution 106 and then separate the gases from water. Another configuration may be employed. For example, like a hydrogen production device 100B shown in FIG. 1B, gas outlets 111 and 112 for introducing only hydrogen and oxygen to the outside may be provided to introduce hydrogen and oxygen outside the device therethrough without circulating the electrolyte solution 106. Also in the configuration in which the electrolyte solution 106 is not circulated as in the hydrogen production device 100B, the electrolyte solution inlets 107 and 108 may be provided to replenish water in the electrolyte solution 106 that is lost by decomposition thereof.

In the present embodiment, a configuration in which a plurality of communicating holes are formed is described, but one communicating hole may be formed. The shape of the communicating hole is not particularly limited. The shape of the openings of the communicating hole seen on the surfaces of the first electrode and the second electrode may be, for example, circular, elliptic, polygonal, or slit-like.

Furthermore, in the present embodiment, the first electrode and the second electrode are directly contacted to establish conduction therebetween. However, for example, in the case where an insulating film is formed on the second electrode side surface of the conductive substrate, the first electrode and the second electrode may be electrically connected using an external circuit.

EXAMPLES

Example 1

Experimental Apparatus

An experimental cell and an experimental system for water decomposition experiment in a hydrogen production device of the present invention are described.

Figure 2A:
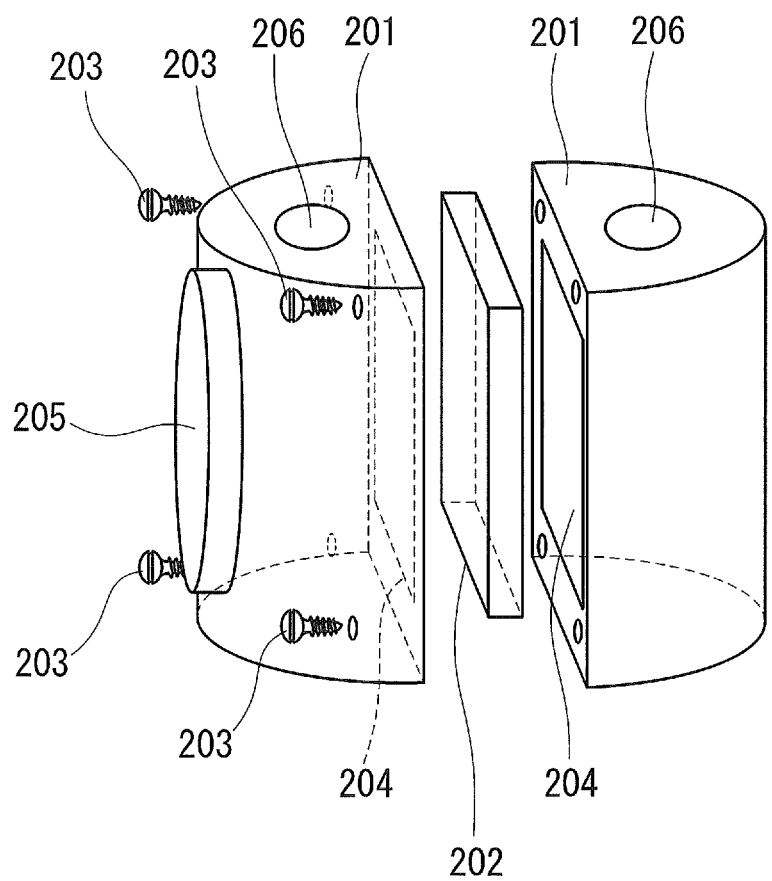
FIG. 2A is an exploded perspective diagram showing a configuration of an experimental cell of Example 1 of the present invention.

FIG. 2A shows a configuration of an experimental cell. The experimental cell was provided with two semi-cylindrical resin containers 201 (φ=10 cm, height=10 cm). The experimental cell had a configuration in which an electrode unit 202 is fixed between these two containers 201 by sandwiching the electrode unit 202 between the rectangular sides of the containers 201 and joining the containers 201 together with four screws 203.

The electrode unit 202 corresponding to the electrode unit 121 (see FIGS. 1A and 1B) described in the embodiment was formed of the conductive substrate 101, the photocatalytic semiconductor layer 102, the ion exchange membranes 104, and the second electrode 103.

The rectangular sides of the two containers 201 were each provided with an opening 204. The electrode unit 202 was disposed between the containers 201 to close the openings 204. One of the two containers 201 was fitted with a quartz window 205 (φ=6 cm) for irradiating the electrode unit 202 with external light, in a portion facing the surface of the electrode unit 202 in which the photocatalytic semiconductor layer (not shown) was disposed. A gas outlet 206 for collecting the produced gas for analysis outside the cell was provided on the top of each of the two containers 201.

Figure 2B:
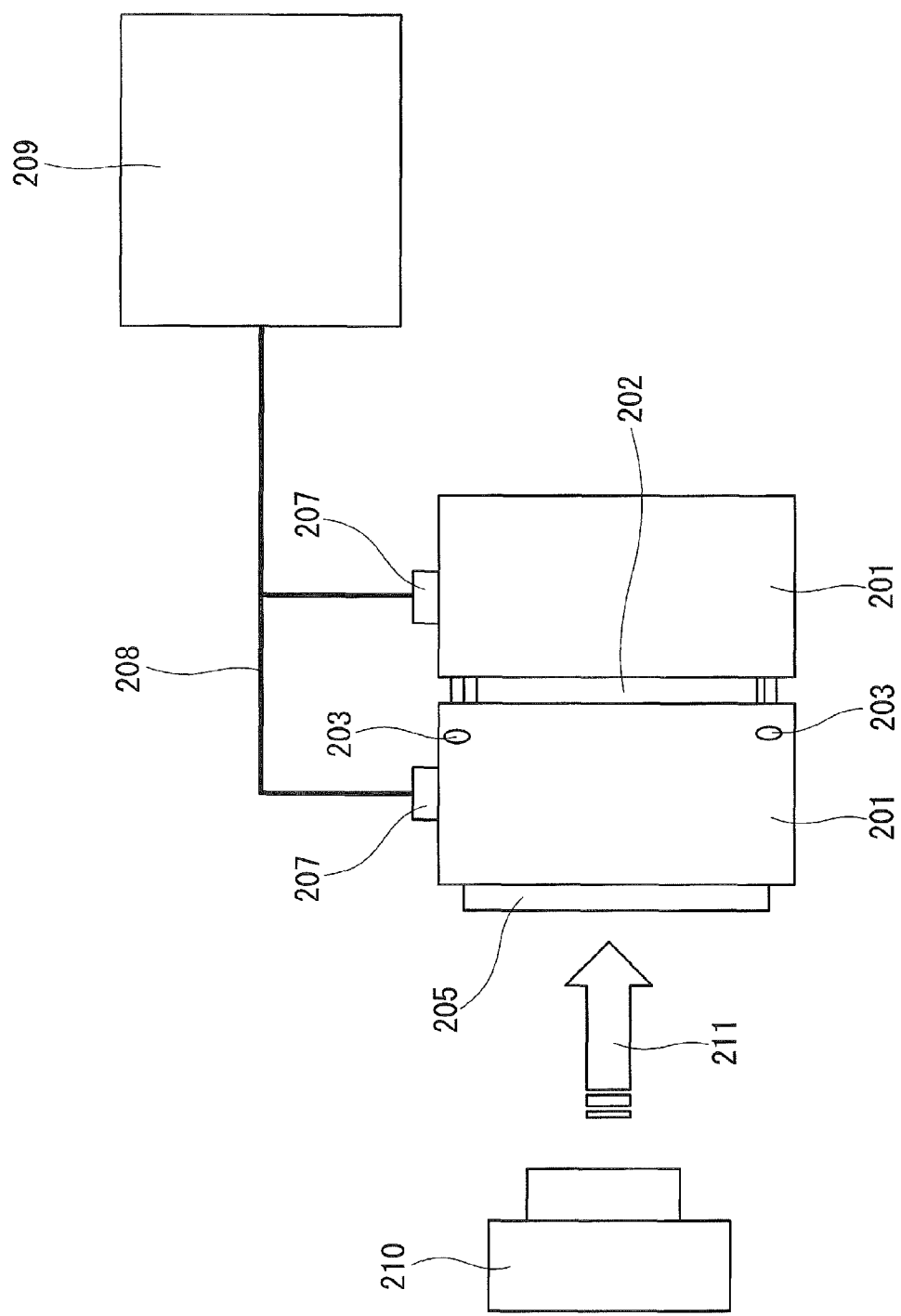
FIG. 2B is a configuration diagram of the experimental system of Example 1 of the present invention.

FIG. 2B shows a configuration of an experimental system using the above experimental cell. The gas produced in each of the containers 201 was introduced to a gas chromatograph 209 (GC-14b, manufactured by Shimadzu Corporation) for analysis through a gas line 208 connected to the container 201 by a joint 207 inserted into the gas outlet 206. A TCD (Thermal Conductivity Detector) as a detector and a molecular sieve as a column were used for the analysis in the gas chromatograph 209.

A water decomposition experiment was performed by irradiating the photocatalytic semiconductor layer (not shown) of the electrode unit 202 with light 211 through the quartz window 205 using a light source 210 (300 W xenon lamp) from the outside of the container 201.

As the electrolyte solution containing water to be decomposed, a 0.1 M (0.1 mol/L) aqueous $K_2SO_4$ solution was used.

<Configuration of Electrode Unit>

Figure 3A:
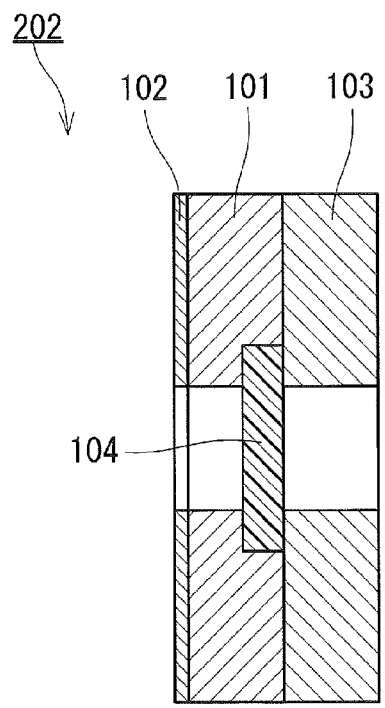
FIG. 3A is a sectional view of an electrode of Example 1 of the present invention.
Figure 3B:
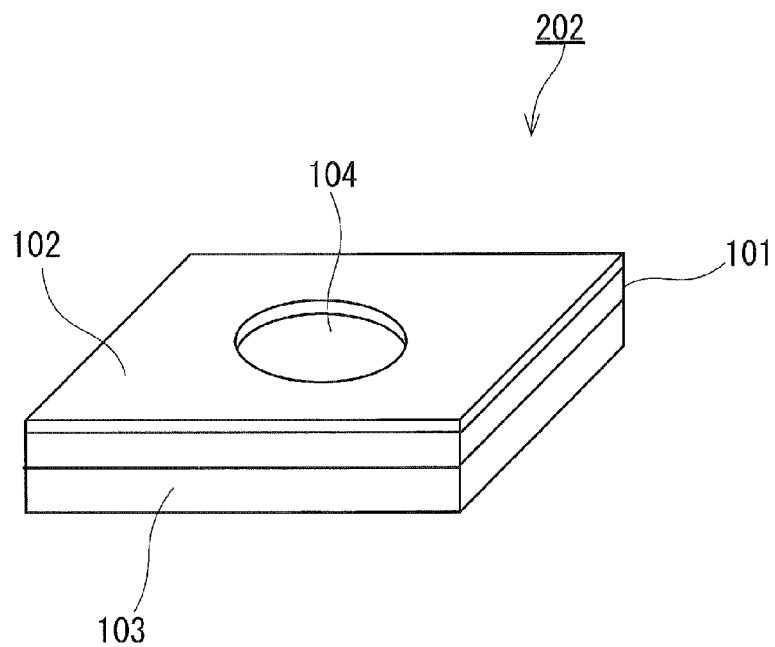
FIG. 3B is a perspective view of the electrode of Example 1 of the present invention.

FIG. 3A and FIG. 3B show a sectional view and a perspective view, respectively, of the electrode unit 202 of Example 1. As the conductive substrate 101, a 8-cm square glassy carbon substrate (manufactured by Tokai Carbon Co., Ltd.) provided with a through-hole with a diameter of 4 cm at its center was used. As the photocatalytic semiconductor layer 102, an n-type photosemiconductor film (500 nm) made of titanium oxide (anatase polycrystal) was formed on one surface of the conductive substrate 101 by sputtering. Furthermore, a groove with a depth almost equal to the thickness of the ion exchange membrane 104 ("Nafion" manufactured by DuPont) was formed around the edge of the through-hole on the surface of the glassy carbon substrate on which titanium oxide was not deposited. The ion exchange membrane 104 was fitted in this groove. Thus, as shown in FIG. 3A, the electrode unit 202 was configured to maintain the electrical conduction between the glassy carbon substrate and a 8-cm square platinum plate used as the second electrode 103 when the ion exchange membrane 104 was sandwiched between the glassy carbon substrate and the platinum plate. The platinum plate also was previously provided with a though-hole so that when the glassy carbon substrate and the platinum plate were laid on each other, the position of the through-hole provided in the substrate and the position of the through-hole provided in the plate coincided with each other so as to form a hole passing through the entire electrode unit 202. In addition, the through-hole was completely closed by the ion exchange membrane 104 to prevent hydrogen and oxygen produced by water decomposition from being mixed together.

In this example, a previously prepared platinum plate was used to fabricate the second electrode 103. However, the second electrode 103 may be deposited on the glassy carbon substrate by vapor deposition, sputtering, or the like after the ion exchange membrane 104 fitted in the glassy carbon substrate is masked.

After the ion exchange membrane 104 was sandwiched between the glassy carbon substrate and the platinum plate, the end faces were bonded and sealed with an epoxy resin. Thus, a structure for preventing water or the like from leaking during the experiment was obtained.

<Water Decomposition Experiment>

In the experiment system, while the electrode unit 202 was irradiated with light continuously through the quartz window 205 of the cell by the light source 210, the quantities of hydrogen and oxygen produced by water decomposition were determined every hour. The hydrogen production rate and the oxygen production rate were 18 μmol/h and 10 μmol/h, respectively. Thus, it was confirmed that water was decomposed almost stoichiometrically.

Example 2

Since an experimental system and an experimental cell used in Example 2 were the same as those used in Example 1, the description thereof is omitted.

Figure 4A:
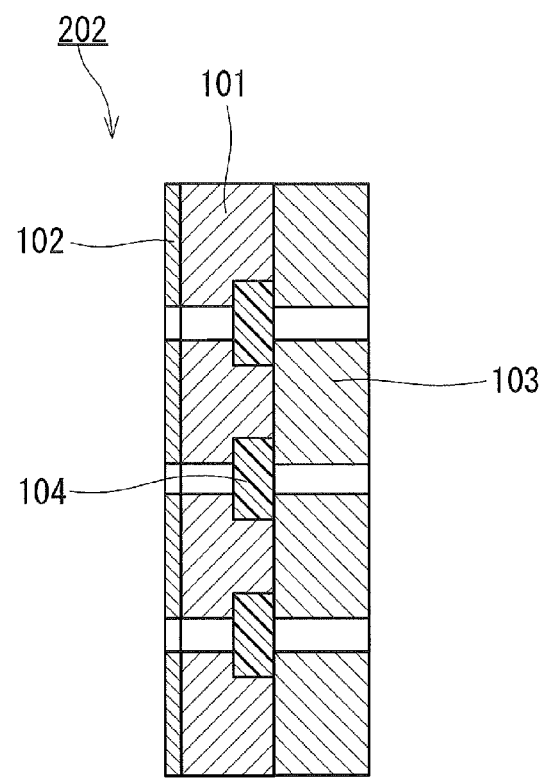
FIG. 4A is a sectional view of an electrode of Example 2 of the present invention.
Figure 4B:
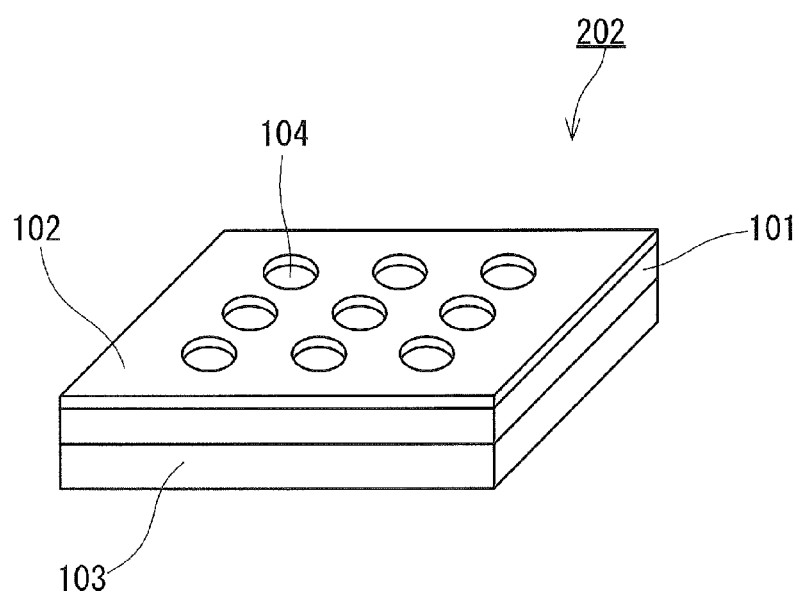
FIG. 4B is a perspective view of the electrode of Example 2 of the present invention.

FIG. 4A and FIG. 4B show a sectional view and a perspective view, respectively, of the electrode unit 202 of Example 2. In Example 2, a glassy carbon substrate provided with a plurality of through-holes with a diameter of 1 cm was used as the conductive substrate 101. Except for this, the fabrication method of the electrode unit 202 is the same as that in Example 1, and therefore, the description thereof is omitted here. The same number of the ion exchange membranes 104 as that of the through-holes were prepared and disposed to completely close them.

A water decomposition experiment was performed using the same experimental system in the same manner as in Example 1. As a result, the hydrogen production rate and the oxygen production rate were 32 μmol/h and 16 μmol/h, respectively. Thus, it was confirmed that water was decomposed stoichiometrically.

Example 3

Since an experimental system and an experimental cell used in Example 3 were the same as those used in Example 1, the description thereof is omitted.

Figure 5A:
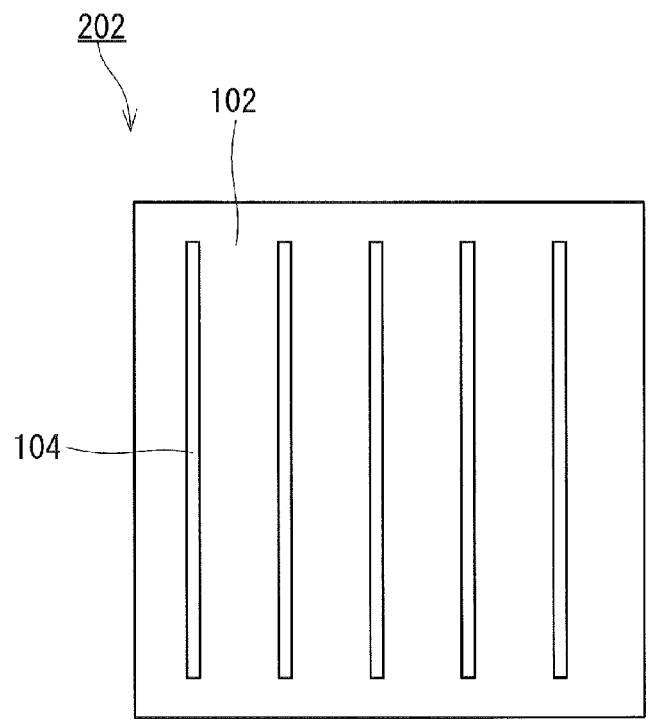
FIG. 5A is a plan view of an electrode of Example 3 of the present invention.
Figure 5B:
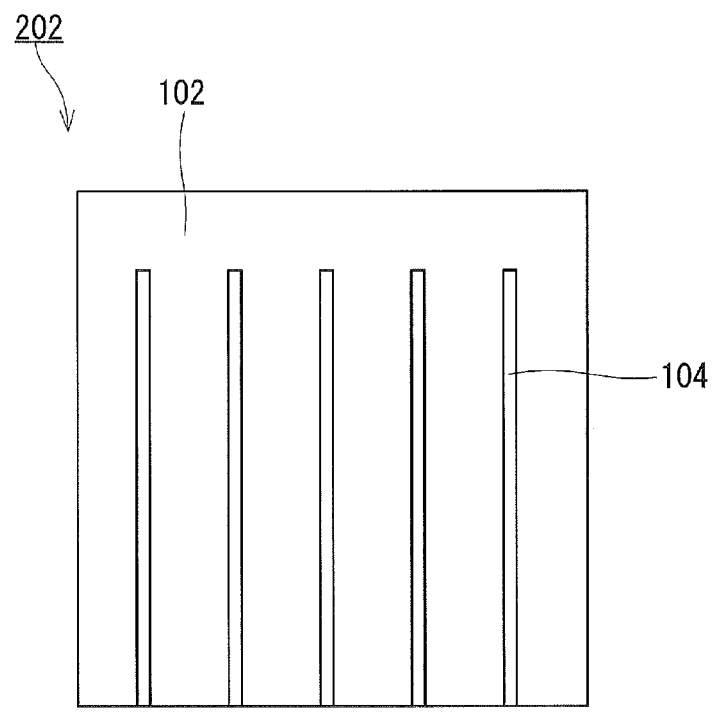
FIG. 5B is a plan view of another electrode of Example 3 of the present invention.

FIG. 5A and FIG. 5B are each a plan view of the electrode unit 202 used in Example 3 seen from the photocatalytic semiconductor layer 102 side.

In Example 3, the electrode unit 202 was fabricated in the same manner as in Example 1, except that a glassy carbon substrate provided with a plurality of slit-shaped through-holes of 0.5 cm×6 cm was used as the conductive substrate. The slit-shaped through-holes may be provided in the center of the glassy carbon substrate (see FIG. 5A), or may be provided such that the glassy carbon substrate is formed in a comb shape (see FIG. 5B). In Example 3, the through-holes were provided such that the glassy carbon substrate was formed in a comb shape, and thus the electrode unit 202 having a structure shown in FIG. 5B was used.

The slit-shaped through-holes are advantageous in that when the ion exchange membranes 104 having substantially the same shape as the communicating holes 130 are fabricated from a large ion exchange membrane by cutting or punching, no portion remains unused.

A water decomposition experiment was performed using the same experimental system in the same manner as in Example 1. As a result, the hydrogen production rate and the oxygen production rate were 23 μmol/h and 12 μmol/h, respectively. Thus, it was confirmed that water was decomposed almost stoichiometrically.

Example 4

Figure 6A:
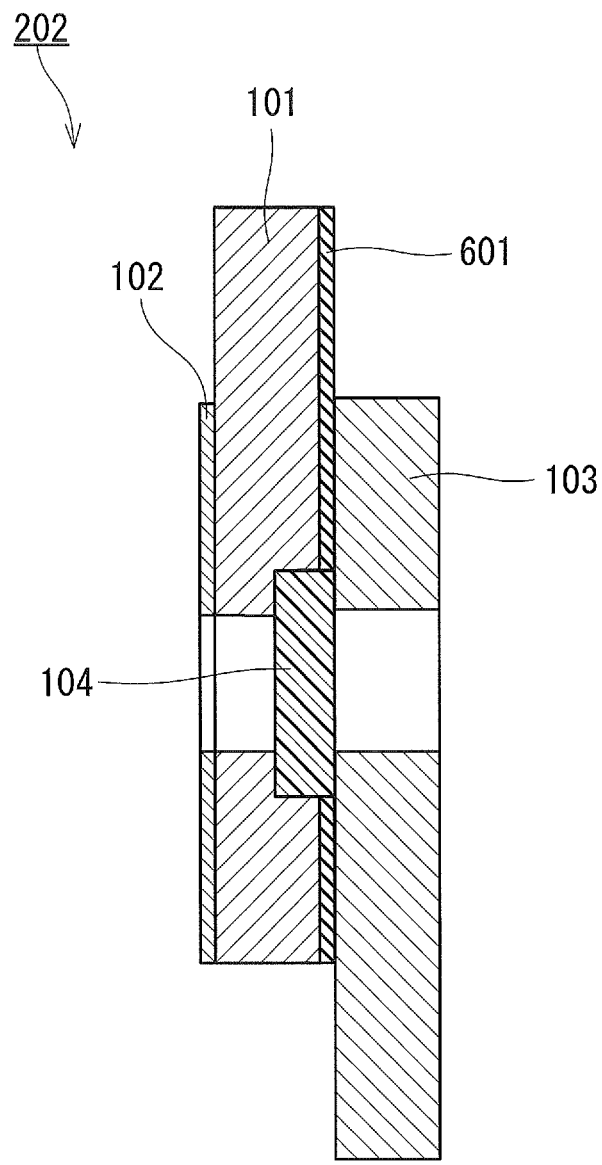
FIG. 6A is a sectional view of an electrode of Example 4 of the present invention.

FIG. 6A shows a configuration of the electrode unit 202 used in Example 4. In Example 4, the electrode unit 202 was fabricated such that a bias could be applied between the first electrode including the conductive substrate 101 and the photocatalytic semiconductor layer 102 and the second electrode 103 as a counter electrode from outside the experimental cell.

As the conductive substrate 101, a 12 cm×8 cm glassy carbon substrate provided with a through-hole with a diameter of 4 cm was used. As the photocatalytic semiconductor layer 102, an n-type photosemiconductor film (500 nm thick) made of titanium oxide (anatase polycrystal) was formed on one surface of the glassy carbon substrate by sputtering. In order to prevent a short circuit between the glassy carbon substrate and the second electrode 103, the surface of the glassy carbon substrate on which titanium oxide was not deposited was coated with an epoxy resin as an insulating layer 601. Furthermore, a groove with a depth almost equal to the thickness of the ion exchange membrane 104 ("Nafion" manufactured by DuPont) was formed around the edge of the through-hole on the surface of the glassy carbon substrate on which titanium oxide was not deposited. As shown in FIG. 6A, the ion exchange membrane 104 was sandwiched between the glassy carbon substrate and the platinum plate used as the counter electrode 103 (in this example, a quartz substrate with platinum deposited thereon). The platinum plate also was previously provided with a though-hole so that when the glassy carbon substrate and the platinum plate were laid on each other, the position of the through-hole provided in the substrate and the position of the through-hole provided in the plate coincided with each other so as to form a hole passing through the entire electrode unit 202. In addition, the through-hole was completely closed by the ion exchange membrane 104 to prevent hydrogen and oxygen produced by water decomposition from being mixed together.

After the ion exchange membrane 104 was sandwiched between the glassy carbon substrate and the platinum plate, the end faces were bonded and sealed with an epoxy resin. Thus, a structure for preventing water or the like from leaking during the experiment was obtained. In this example, the insulating film 601 was provided on the second electrode 103 side surface of the glassy carbon substrate, but the insulating film 601 does not necessarily have to be provided.

Figure 6B:
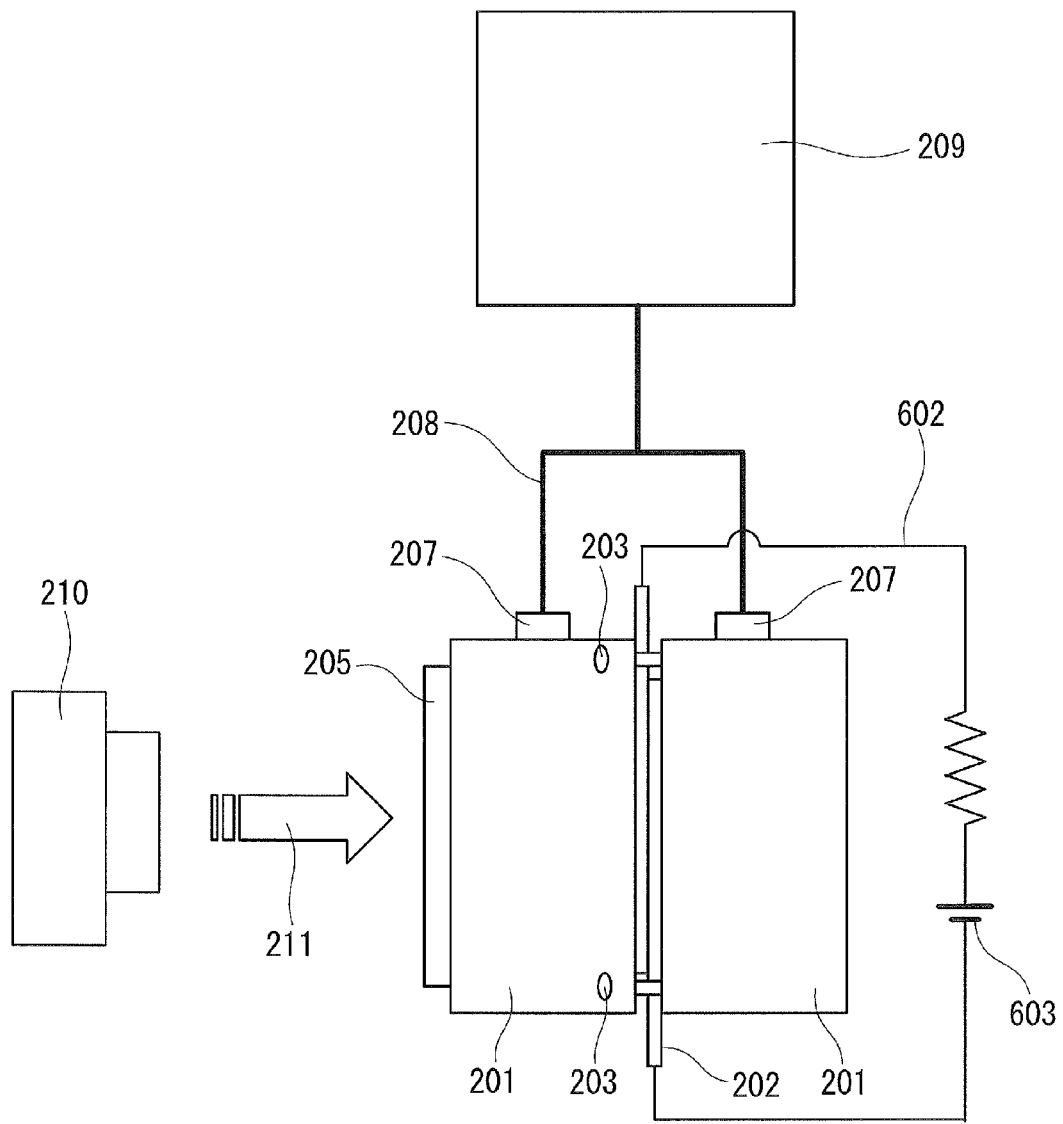
FIG. 6B is a configuration diagram of an experimental system of Example 4 of the present invention.

FIG. 6B shows a configuration of an experimental system of Example 4.

The glassy carbon substrate of the conductive substrate 101 and the platinum plate of the second electrode 103 each protruded outside the cell, as shown in FIG. 6B, and the protruding portions were connected by a copper wire to fabricate an external circuit 602. The external circuit 602 was provided with a mechanism 603 capable of applying a bias to the first electrode including the conductive substrate 101 and the photocatalytic semiconductor layer 102 and the second electrode 103. In this example, a configuration in which the first electrode and the second electrode were electrically connected by the external circuit was employed. However, even in the case where the external circuit is provided, cost reduction can be achieved because the area of the ion exchange membrane can be reduced compared to conventional ones.

A water decomposition experiment was performed as follows. In the experiment system shown in FIG. 6B, while the electrode unit 202 was irradiated with light continuously through the quartz window 205 of the cell by the light source 210, the quantities of hydrogen and oxygen produced by water decomposition were determined every hour. A bias of 0.5 V was applied between the conductive substrate 101 and the second electrode 103. The hydrogen production rate and the oxygen production rate were 157 μmol/h and 76 μmol/h, respectively. Thus, it was confirmed that water was decomposed almost stoichiometrically. In this example, a bias of 0.5 V was applied, but the bias is not limited to 0.5 V. However, it is desirable that the bias to be applied do not exceed 1.23 V, which is a voltage required for electrolysis of water.

Comparative Example

As a comparative example, the electrode unit 202 was fabricated in the same manner as in Example 4, except that the conductive substrate 101 and the second electrode 103 were not provided with a through-hole. A water decomposition experiment was performed as follows using the same experimental system as that in Example 4. Biases of 0 V and 0.5 V were applied to the conductive substrate 101 and the second electrode 103 from outside while irradiating the photocatalytic semiconductor layer 102 with light. As a result, neither hydrogen nor oxygen were produced in either case. This is probably because a liquid junction was not formed between the first electrode side and the second electrode side, which prevented ion exchange therebetween.

Table 1 shows the results of the water decomposition experiments in the examples and comparative example.

TABLE 1

| | Features | Hydrogen production rate [μmol/h] | Oxygen production rate [μmol/h] |
|---|---|---|---|
| Example 1 | One through-hole | 18 | 10 |
| Example 2 | A plurality of through-holes | 32 | 16 |
| Example 3 | Slit-shaped through-holes | 23 | 12 |
| Example 4 | Through-hole + External bias applied | 157 | 76 |
| Com. Example | No through-hole | Not detected | Not detected |

INDUSTRIAL APPLICABILITY

The hydrogen production device according to the present invention can be provided at lower cost, and further can achieve reduction in space occupied. Therefore, it is useful for energy systems such as fuel cells that require a supply of hydrogen.

The invention claimed is:

1. A hydrogen production device comprising:
a first electrode including a conductive substrate and a photocatalytic semiconductor supported on the conductive substrate;
a second electrode that is electrically connected to the first electrode and disposed in a second region opposite to a first region relative to the first electrode, wherein the first region is defined as a region on a side facing a surface of the first electrode on which the photocatalytic semiconductor is provided;
a water-containing electrolyte solution in contact with the photocatalytic semiconductor and the second electrode; and
a housing containing the first electrode, the second electrode, and the electrolyte solution, wherein
the first electrode is provided with a plurality of first through-holes and the second electrode is provided with a plurality of second through-holes, and the first and second through-holes are positioned to form a plurality of communicating holes for allowing the first region and the second region to communicate with each other,
ion exchange membranes having substantially the same shape as the communicating holes are disposed in the communicating holes to close the communicating holes, and
a diameter of the first through-holes is smaller than a diameter of the ion exchange membranes.

2. The hydrogen production device according to claim 1, wherein each of the communicating holes is in the form of a slit.

3. The hydrogen production device according to claim 1, wherein the second electrode is disposed in contact with the conductive substrate.

4. The hydrogen production device according to claim 1, further comprising an external circuit for electrically connecting the first electrode and the second electrode.

5. The hydrogen production device according to claim 4, wherein the external circuit applies a bias voltage between the first electrode and the second electrode.

6. The hydrogen production device according to claim 3, wherein the ion exchange membranes are sandwiched between the second electrode and the conductive substrate.

7. The hydrogen production device according to claim 1, further comprising a DC power source that applies a bias voltage between the first electrode and the second electrode.

8. The hydrogen production device according to claim 1, wherein the first through-holes have a diameter in a range of 1 to 4 cm.

9. The hydrogen production device according to claim 2, wherein the communicating holes in the form of the slit are positioned in an edge of the conductive substrate.

10. The hydrogen production device according to claim 1, wherein the ion exchange membranes are not present at surfaces of the first and second electrode.

11. The hydrogen production device according to claim 1, wherein the ion exchange membranes are disposed on a surface of the first or the second electrode.

12. The hydrogen production device according to claim 1, wherein the conductive substrate is provided with a plurality of grooves around the first through-holes on a surface facing the second electrode, and the ion exchange membranes are provided on the grooves.

13. The hydrogen production device according to claim 12, wherein surfaces of the ion exchange membranes facing the second electrode are coplanar with a surface of the conductive substrate.

* * * * *